RALPH L. CORDELL
JULIAN F. EVANS
INVENTORS.

BY Newell Pottof

ATTORNEY

March 31, 1964 R. L. CORDELL ETAL 3,126,976
SEISMIC VELOCITY LOGGING OF LOW-VELOCITY
WELL FORMATIONS
Filed Oct. 17, 1960 2 Sheets-Sheet 2

RALPH L. CORDELL
JULIAN F. EVANS
*INVENTORS.*

BY *Newell Pottoff*

*ATTORNEY*

# United States Patent Office 3,126,976
Patented Mar. 31, 1964

3,126,976
SEISMIC VELOCITY LOGGING OF LOW-VELOCITY WELL FORMATIONS
Ralph L. Cordell and Julian F. Evans, Tulsa, Okla., assignors to Pan American Petroleum Corporation, Tulsa, Okla., a corporation of Delaware
Filed Oct. 17, 1960, Ser. No. 63,192
9 Claims. (Cl. 181—.5)

This invention relates to seismic velocity well-logging and is directed to a method and apparatus for logging in wells where the well formations have lower seismic wave-transmission velocities than the liquid in the well bore.

In recent years, a number of commercial services and instruments have been developed and offered for sale for obtaining acoustic or seismic interval velocity logs in wells. Continuous velocity logging of well formations as now performed by these commercial well-logging services generally involves passing through the well bore a transmitter of high-frequency acoustic or seismic impulses and one or more receivers for these impulses acoustically separated and physically spaced from the transmitter by a short distance. The impulses travel from the transmitter to the receiver by several different paths, but the only ones generally of interest are those that traverse the formations. The travel times of these impulses to the receiver, or through the formation interval between two or more spaced receivers, are measured.

As long as the formation seismic velocity is sufficiently greater than the velocity of the impulses in the well liquids, the desired impulses arrive first, so that the velocity measurements can be reliably made by instrumentally picking the first impulse arrivals at the detector or detectors. Even though the amplitudes of the impulses travelling through the liquid or as surface waves along the wall of the well are often many times stronger than the first-received impulses travelling through the formations, these stronger impulses can be completely discriminated against because of their later arrival.

This order of wave arrivals does not hold true, however, for formations near the ground surface, and occasionally also for deeper formations. As is well known, formations within the so-called weathering, to use the term commonly employed in seismic geophysical prospecting to designate the strata nearest the surface, almost always have lower velocities than the 5000 feet per second, more or less, velocities of the seismic or acoustic waves in well liquids. While the formations below the weathering ordinarily have sufficiently higher velocities than the well liquids to be correctly logged by the present commercial instruments, it is occasionally true that deeper layers are also of lower velocity than the well liquids. For formations both in the weathered layer and in low-velocity subweathering strata, the first arrivals through the liquid cannot be discriminated against by the instrument so as to detect the desired later arrivals through the low-velocity formation. Consequently, the velocities indicated for such formations can be completely erroneous.

Another factor which frequently prevents the effective logging of near-surface, low-velocity formations is the attenuation of the high-frequency seismic impulses. As such low-velocity formations are frequently relatively unconsolidated, they are correspondingly poor transmitters of the high-frequency impulses applied thereto. Accordingly, the transmitted impulse amplitudes are sometimes too small for satisfactory detection.

One of the more prominent uses made of continuous velocity logs is in the interpretation of seismic records, where the velocity determined by the logs is useful both in converting measured travel times to true depths below the ground surface and in correlating specific reflections or wave forms with definite geologic subsurface formations. In such uses, and particularly in converting travel times to depths and/or determining the reflection coefficients of subsurface interfaces, it is highly desirable that the logged velocity information extend all the way from the surface of the ground to the greatest possible depth. As has been pointed out, however, present commerical instruments are unable to furnish this near-surface information; and, in fact, the data they obtain are sometimes of questionable value over a substantial range of near-surface depths, where unsuspected low-velocity subsurface formations may be present but remain undetected.

In view of the foregoing, it is a primary object of our invention to provide a novel method and apparatus for obtaining in wells true seismisc wave transmission velocity logs of formations which may have either a higher or lower seismic-wave velocity than the well-bore liquids. It is another object of the invention to provide a logging method and apparatus for effectively preventing transmission of acoustic impulses through the liquid between a well transmitter and receiver of seismic impulses. Still another object is to provide such a logging method and apparatus which is capable of attenuating liquid-transmitted seismic impulses to such a level below that of the formation impulses that low-velocity formations may be correctly logged by the present types of log-recording equipment. Other and further objects, uses, and advantages of the invention will become apparent as the description proceeds.

Briefly stated, the foregoing and other objects of the invention are accomplished by introducing and/or maintaining in the borehole in the region to be logged a cloud or dispersion of scattering particles such that the transmission of sound through the borehole liquid is substantially reduced or effectively prevented. According to our preferred embodiment of the invention, a quantity of gas is introduced into the well bore liquid in the form of a dispersion or cloud of very fine bubbles, which so scatter and absorb the liquid-borne sound waves that they are received, if at all, with much less amplitude than the formation-borne waves. While such a dispersion or cloud of bubbles may be introduced into the well bore liquids in the form of a relatively stable foam immediately prior to running the logging instrument into the well, it is preferred that the means for forming the bubble dispersion be self-contained and a part of the acoustic logging instrument, so that the bubble dispersion or cloud can be formed as nearly as possible at the same time and place as the logging measurements are carried out. In order that the impulses travelling through the formations may be transmitted and received with satisfactory amplitudes, firm contact with the well wall is provided for both the transmitter and receiver by appropriate means.

This will be better understood by reference to the accompanying drawings taken with the description following, which drawings illustrate a typical embodiment of the invention. In these drawings, FIGURE 1 is a generalized earth cross section with an embodiment of the invention shown in block-diagram form;

Figures 1, 2:
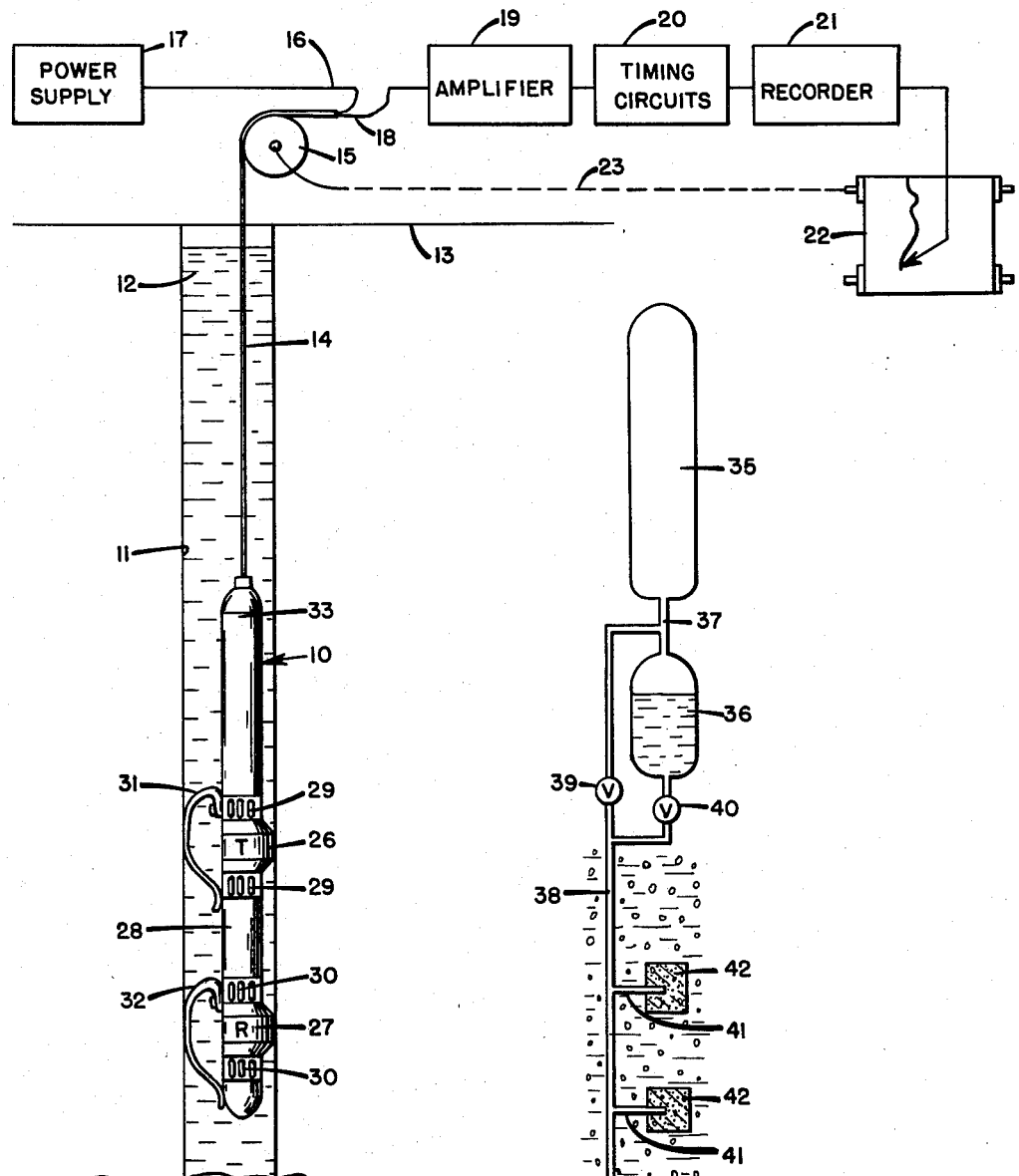
FIGURE 2 is a detailed diagrammatic view of a bubble-generating mechanism in accordance with one embodiment of the invention.

Referring now to these drawings in detail, and particularly to FIGURE 1 thereof, this figure shows a well instrument 10 in logging position in a well 11 substantially filled with a liquid or drilling fluid 12 to a level close to the ground surface 13. The instrument 10 is supported and moved through the well 11 by an insulated-conductor cable 14 which at the ground surface 13 passes over a measuring wheel 15. One of the conductors 16 of cable 14 is connected to a power supply 17 by which electrical power for operation of the instrument 10 is supplied when the instrument is traversing the well formations. By another lead 18 of the cable 14, signals detected by the receiver of the instrument are fed to a receiving and recording amplifier 19 which transmits the various impulses received over the conductor 18 to a timing circuit 20, the output of which goes to a recorder 21 for recording on a chart 22. The chart 22 is moved in accordance with the depth of instrument 10 in the well 11 by a mechanical connection 23 to the depth-measuring wheel 15. The trace on chart 22, depending upon the characteristics of timing circuit 20, is an indication of the varying travel time of acoustic impulses through the well formations adjacent the instrument 10, or alternatively of the velocity of this travel.

Most of the particular details of the instrument 10 and its associated ground-surface power supply and recording equipment are not important in the present invention and may therefore take any of a variety of forms. For example, the transmitter 26, the receiver 27, and the spacing member 28 between them, as well as the ground-surface equipment, may be like any of those shown and described on pages 586 to 614 of Geophysics, volume XVII (July 1952), the publication of the Society of Exploration Geophysicists.

The modifications of this conventional apparatus in accordance with the present invention comprise providing openings 29 above and below transmitter 26 and openings 30 above and below receiver 27. Fastened to the outside of the housing of instrument 10, respectively adjacent transmitter 26 and receiver 27 are bow springs 31 and 32 which separately hold the transmitter and receiver against the wall of well 11.

Enclosed within the elongated upper housing portion 33 of instrument 10, besides part of the electrical circuitry, is part of the apparatus shown in FIGURE 2. This includes a high-pressure gas cylinder 35 and a liquid container 36. By an open tubing 37, extending between the bottom of gas holder 35 and the top of liquid container 36, the gas pressure is equalized above the liquid surface in vessel 36. A valve 39 in a conduit extending from a T in tubing 37 controls the flow of gas from chamber 35 into a tubing 38, while a valve 40 similarly controls the discharge of liquid from container 36 into the tubing 38. The tubing 38 extends downwardly through the instrument 10 to a pair of side branches 41 which terminate in a pair of cylindrical porous caps 42 located inside of the housing behind apertures 29 adjacent transmitter 26. An extension 43 of the tubing 38 extends to a similar pair of branches and porous caps (not shown) respectively behind the apertures 30 adjacent the receiver 27. The valves 39 and 40 are preferably an easily adjustable type such as needle valves or the like, so that the release of gas from the container 35 and of liquid from the container 36 can be closely adjusted as to rate.

In operation, the containers 35 and 36 are respectively filled with a gas at high pressure and a suitable liquid which stabilizes the gas bubbles released into the bore-hole liquid so as to inhibit their combining to form large bubbles, thereby maintaining them in the state of small, dispersed bubbles. In a logging operation, the valves 39 and 40 are adjusted to release the gas and the foam-stabilizing liquid at suitable relative rates, and the instrument 10 is lowered promptly to the desired depth to start logging the near-surface formations in the well 11. As the gas and the foam-stabilizing liquid pass outwardly through the small pores of the porous caps 42, small bubbles are formed in the well fluid on the surface of these caps and pass outwardly through the apertures 29 and 30 into the well bore. Although part of the gas in the container 35 is released during the downward passage of instrument 10 into the well 11, the release rate is preferably slow enough that a substantial portion of the gas supply remains at the time the instrument reaches its maximum depth for shallow-formation logging, and logging is started by traversing the instrument upwardly. The bubble cloud is accordingly continuously generated or augmented during the upward logging run. As the instrument nears the surface of the ground 13 in a logging run, the lowering hydrostatic pressure of the liquid 12 causes the bubbles to form at an increasing rate. Accordingly, when the lowest-velocity formations are reached nearest to the ground surface 13, the most-dense cloud of bubbles is being dispersed into the well-bore liquids. This is true despite depletion of the pressure in the pressure vessel 35, since this reduction in pressure is to a substantial extent offset by the reduced hydrostatic pressure of the liquid 12.

In the upward logging traverse, the transmitter 26, receiver 27, and associated electronic and recording circuits are actuated in the conventional way for recording. Due to the presence of the bubbles in the well-bore liquid 12, the transmission of acoustic impulses through this liquid is substantially completely cut off. However, since the springs 31 and 32 hold the transmitter and receiver in physical contact with the well wall, the bubbles do not similarly prevent transmission of acoustic impulses into and out of the well formations. Accordingly, therefore, even though the transmission of the acoustic impulses is often greatly attenuated by the unconsolidated low-velocity formations, it is normally still sufficient for detection by the detector 27 without interference from a water wave. Thus, the combined effect of the energy-absorbing bubbles and the springs 31 and 32 making physical contact between the source and receiver and the well formations, is such as to permit logging of the velocity of these formations in a relatively continuous manner.

At very low formation velocities, it will sometimes be desirable to move the instrument upwardly in an intermittent fashion rather than continuously, for the reason that the frictional contact with a well wall introduces a certain amount of noise in the circuits of receiver 27. Thus, each time the raising of the detector and transmitter is interrupted, a noise-free reading of formation velocity at the level between the source and detector is obtained.

Figure 3:
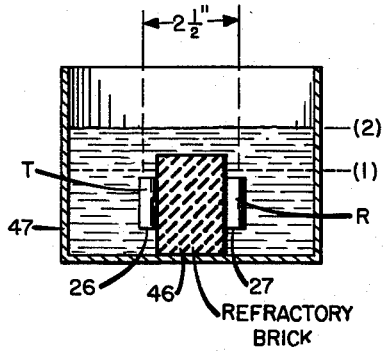
FIGURES 3 and 4 are, respectively, a diagrammatic cross-sectional view of an experimental apparatus and record traces obtained thereby.
Figure 4:
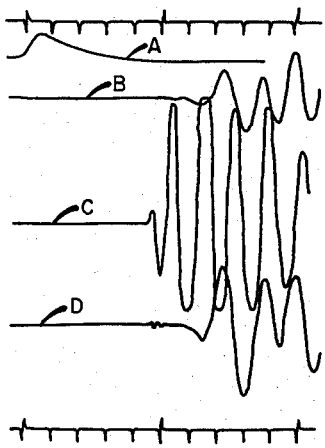

The high degree to which this invention suppresses the undesired water-transmitted waves to permit logging of the formation-transmitted pulses is qualitatively illustrated in FIGURES 3 and 4. A test was performed as shown in FIGURE 3 in which a refractory brick 46, having a lower seismic wave transmission velocity than water was placed in a container 47, shown in diagrammatic cross section. A transmitter 26 and receiver 27 for ultrasonic impulses were placed in contact with the sides of the brick 46 at a spacing of about 2½ inches.

The traces of FIGURE 4 were made under various conditions of submergence in water. On the timing traces at the top and bottom of the figure the pip spacing is 10 microseconds. Upper data trace A is the shape of the impulse applied to the brick 46 by the transmitter 26. Trace B shows the form of the impulse detected by the receiver 27 when the liquid level was just such as to cover the tops of the transmitter and receiver and couple them efficiently to the brick but not sufficient to provide a complete path for wave travel through the water. This level is shown in FIGURE 3 as level (1). Trace C of FIGURE 4 is the form of the trace recorded by receiver 27 when the water in vessel 46 was raised to level (2) above the upper edge of the brick, so that there was available a complete travel path through the water from transmitter 26 to receiver 27. Trace D is the trace made under the same conditions as C, except that a cloud of bubbles was dispersed in the liquid in the vessel 47. As will be apparent, the very large water wave, which is of such amplitude as to overload the recording system as shown in trace C, is just barely visible on trace D, and the latter trace shows clearly the transmission of the acoustic impulse through the brick 47 in the same way as it was shown by trace B. Thus, trace D clearly demonstrates the almost complete absorption of the high-frequency impulse of the transmitter 26 along the liquid path when bubbles are present therein.

As to the amount of bubble formation, no accurate measurement was made, but it was estimated that the absorption of undesired energy was quite strong when the bubbles occupied less than 5% of the liquid volume. As the proportion of space occupied by the bubbles became larger, the absorption became even more nearly complete. For well logging, it appears that a bubble dispersion occupying at least about 5% to 10% of the wellbore volume will be adequate, though any larger proportion that can be provided will be useful.

Figure 5:
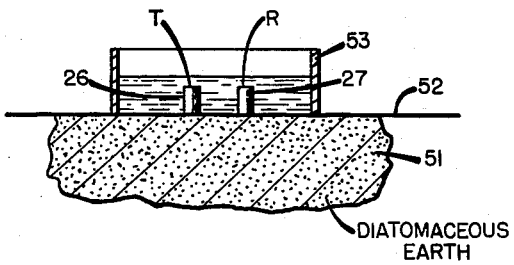
FIGURES 5 and 6 are, respectively, a diagrammatic cross-sectional view of, and record traces obtained by, a second form of experimental apparatus.
Figure 6:
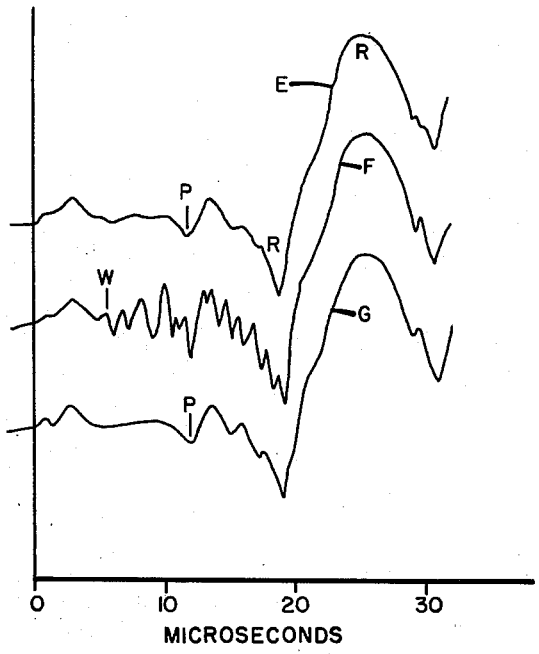

A somewhat analogous experiment and results are illustrated in FIGURES 5 and 6. Thus, as is shown in FIGURE 5, a sample 51 of diatomaceous earth, known to have a quite low seismic wave transmission velocity, was contacted by a transmitter 26 and receiver 27 of ultrasonic impulses at a close spacing. A thin film or membrane 52 was placed over the surface of porous sample 51 to prevent the entrance of liquid into it.

In FIGURE 6, the upper trace E is the form of the wave received from transmitter 26 by receiver 27 in the presence of air. The wave arrival of interest showing the transmission time through the sample 51 is designated as P on this trace. The large-amplitude wave R is believed to be a surface wave of Rayleigh type. Trace F of FIGURE 6 is the same as trace E, except that water in a container 53 was placed against and surrounding the transmitter and receiver 26 and 27. Here, the arrival marked W, corresponding to the transmission of seismic energy through the liquid, substantially completely obscures any later arrival at the time of P. Upon replacing the water in container 53 with a thick, absorbing drilling mud, trace G was obtained substantially duplicating E and showing complete absorption of the high-frequency water wave arrival starting at W in trace F. Thus, it was shown that for these quite high frequency waves, scattering by the particles of suspended solids in a viscous drilling fluid is itself effective to prevent the transmission of the energy through the liquid phase.

The ordinates of the curves in FIGURE 6 are not significant. The amplification was varied as necessary to give similar trace amplitudes and the traces were displaced vertically so as not to overlap. It should also be understood that thick muds containing scattering particles will not be effective in ordinary logging operations, because the pulse frequencies are much lower than were used in this experiment. Only for very high frequencies, such as were used here, will heavy mud be effective. The main point demonstrated by the experiment was that quite low velocity materials could be logged with good contact between them and the source and receiver, in the presence of a shielding liquid.

As to the nature of the gas to be supplied by the container 35, it can be compressed air, nitrogen, carbon dioxide or the like, any gas which is not readily dissolved in the well-bore liquids being satisfactory. Instead of employing the container 35, it can also be conveyed to the desired points of release in the well bore by a hose paralleling the cable 14. This, of course, is not a difficult requirement, as the low-velocity formations to be logged are normally found at relatively shallow depths.

As to the nature of the foam- or bubble-stabilizing agent provided from container 36, it can be any of a number of well-known commercially available foaming or sudsing agents, preferably in a somewhat dilute water solution. One example of such materials which we have used successfully is that sold by Swift and Company under the trademark "Solar 25," which is a combination of coconut oil fatty acid amine condensate and an amine sulfonate. Instead of adding the foaming agent to the well liquids at the same time as the bubbles are being formed, it can also be introduced into the well liquids before running the logging instrument into the well, or by means of a separate jet or outlet during lowering of the instrument to logging depth. In some cases also the effectiveness of the bubble formation and stability of the bubbles formed can be increased by adding a small amount of some thickening agent to the well liquid 12, such as a small proportion of carboxymethyl cellulose, bentonite, or the like.

While our invention has been described with reference to the foregoing specific details and embodiment, it is to be understood that other and further modifications will be apparent to those skilled in the art. The scope of the invention therefore should not be considered as limited to the details set forth, but is properly to be ascertained from the appended claims interpreted in view of our disclosure.

We claim:

1. In seismic velocity logging of well formations which may have lower seismic wave-transmission velocities than the liquids in the well wherein impulses are transmitted from a transmitter to at least one receiver a short fixed distance away and an indication is recorded of the travel time of each first-arriving impulse at said receiver, the improvement which comprises the additional step of holding said transmitter and receiver separately in contact with the formations, in the presence of a large number of small seismic wave-scattering particles at least in the well-bore space between said transmitter and receiver.

2. In seismic velocity logging of well formations which may have lower seismic wave-transmission velocities than the liquids in the well wherein impulses are transmitted from a transmitter to at least one receiver a short fixed distance away and an indication is recorded of the travel time of each first-arriving impulse at said receiver, the improvement which comprises the additional steps of holding said transmitter and receiver separately in contact with the formations exposed at the well wall, and dispersing in said well liquid close to and between said transmitter and receiver a large number of small seismic wave-scattering particles.

3. In seismic velocity logging of well formations as in claim 2, the improvement as in claim 2 in which said dispersing step comprises slowly releasing a gas under pressure into said well liquid close to and between said transmitter and receiver to form a dispersion of small bubbles.

4. In seismic velocity logging of well formations as in claim 2, the improvement as in claim 2 in which said dispersing step comprises slowly releasing a gas under pressure into said well liquid close to and between said transmitter and receiver to form a dispersion of small bubbles, and including the further step of adding to said liquid a foam-stabilizing chemical agent.

5. In seismic velocity logging of well formations as in claim 2, the improvement as in claim 2 in which said dispersing step comprises slowly releasing into the well liquid close to and between said transmitter and receiver a mixture of a gas under pressure and a foam-stabilizing material to form a relatively stable dispersion of small bubbles in said liquid at least between said transmitter and receiver.

6. In combination with apparatus for seismic velocity well logging including a transmitter and receiver of high-frequency seismic impulses spaced a fixed distance apart and adapted to be passed through a well, and means connected to said receiver for recording indications related to the travel time of the first-arriving impulses arriving at said receiver from said transmitter, the improvement comprising means attached to said transmitter and receiver for separately holding said transmitter and said receiver against a well wall, and means associated with said transmitter and receiver for dispersing into the well liquid at least in the space between said transmitter and receiver a large number of seismic wave-scattering particles.

7. In combination with apparatus as in claim 6, the improvement as in claim 6 in which said dispersing means comprises a container of gas under pressure, a tubing extending from said container to an outlet point in said space, and adjustable valve means in said tubing for regulating the flow of said gas to said outlet point.

8. In combination with apparatus as in claim 6, the improvement as in claim 6 in which said dispersing means comprises a container of gas under pressure, a tubing extending from said container to at least one outlet point in said space, a container of foam-stabilizing material connected to said tubing, and adjustable valve means in said tubing for regulating the flow of said gas and said material to said outlet point.

9. In combination with apparatus as in claim 6, the improvement as in claim 6 in which said dispersing means comprises a container of gas under pressure, a tubing extending from said container to a plurality of outlet points respectively adjacent said transmitter and said receiver, adjustable valve means in said tubing for regulating the flow of said gas to said outlet points, and means at each of said points for releasing said gas into the well liquid as a dispersion of fine bubbles.

References Cited in the file of this patent

UNITED STATES PATENTS

| | | |
|---|---|---|
| 2,725,282 | Buckley et al. | Nov. 29, 1955 |
| 2,768,701 | Summers | Oct. 30, 1956 |
| 2,846,019 | Lang | Aug. 5, 1958 |
| 2,954,090 | Burg et al. | Sept. 27, 1960 |
| 2,954,750 | Crump et al. | Oct. 4, 1960 |